J. E. HOLMES.
Pistons for Atmospheric Motors.
No. 151,981.                                       Patented June 16, 1874.
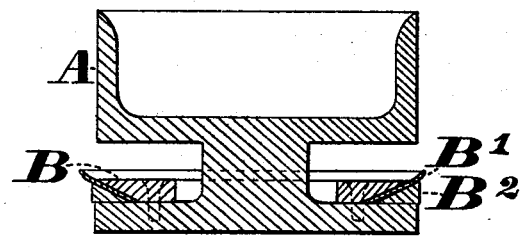

UNITED STATES PATENT OFFICE.

JOSEPH E. HOLMES, OF NEW YORK, N. Y.

IMPROVEMENT IN PISTONS FOR ATMOSPHERIC MOTORS.

Specification forming part of Letters Patent No. 151,981, dated June 16, 1874; application filed July 14, 1873.

*To all whom it may concern:*

Be it known that I, JOSEPH ELLICOTT HOLMES, of the city and State of New York, United States of America, now residing in London, England, have invented certain new and useful Improvements in Pistons for Atmospheric Motors, and for other purposes, of which the following is a specification:

I am well aware that several arrangements have been devised and patented for utilizing the pressure of the atmosphere as a motive power; but, so far as I know, the pistons used or introduced into such motors have been of the ordinary construction, wherein the packing, when properly air-tight, has produced so much friction as to defeat the object sought to be gained—namely, a cheap and efficient use of the weight of the atmosphere as a motor.

My said invention consists of a nearly frictionless piston, consisting of several rings—the first a ring of metal, or its equivalent, for securing the parts together; second, a very thin elastic ring of rubber, or other suitable material, made a little larger than the cylinder; and a third or base ring, which is made slightly smaller than the cylinder, so as to move freely within it, and of a very firm hard rubber, with very little elasticity, and having its outer edge much thicker than its inner edge.

In the drawing is shown a vertical section through the piston and packing, clearly representing my said invention.

A is the body of the piston, of metal or other suitable material. B represents a ring of metal, for securing the packing in place. $B^1$ is a thin ring, about one-sixteenth of an inch thick, of rubber or other elastic material. $B^2$ is the lower packing-ring, which is made of very firm hard rubber, with very little elasticity. Its section represents a right-angle triangle, substantially as shown in the drawing, the inner edge being very thin. It is made just large enough to move freely in the cylinder, while the thin elastic ring $B^1$ is made much larger, so as to be pressed outward against the cylinder by the action of the atmosphere, the form of the packing-ring $B^2$ inclining it upward in the proper position for such action, as shown in the said drawing.

In action, as the plunger is raised in the cylinder, the air presses the base of the piston and the thin elastic packing outward toward the sides of the cylinder, and seals the aperture perfectly between it and the piston, while the area is so small that the friction is but nominal.

I claim as my invention—

The combination of the thin elastic ring B with the harder ring $B^2$, having the form or shape substantially as described, as and for the purposes shown.

JOSEPH ELLICOTT HOLMES.

Witnesses:
 GEORGE HASELTINE,
 HENRY I. NOONE.